United States Patent [19]

Splitt

[11] 3,961,229

[45] June 1, 1976

[54] TWO PAIR STATION PROTECTOR

[75] Inventor: Frank G. Splitt, Arlington Heights, Ill.

[73] Assignee: Cook Electric Company, Morton Grove, Ill.

[22] Filed: Oct. 9, 1974

[21] Appl. No.: 513,400

[52] U.S. Cl. .................................. 317/120; 317/116
[51] Int. Cl.² .......................................... H02B 1/08
[58] Field of Search ............ 317/116, 117, 118, 120

[56] References Cited
UNITED STATES PATENTS

| | | | |
|---|---|---|---|
| 3,310,712 | 3/1967 | Paddock | 317/120 |
| 3,345,542 | 10/1967 | Paddock et al. | 317/116 |

*Primary Examiner*—J D Miller
*Assistant Examiner*—Harry E. Moose, Jr.
*Attorney, Agent, or Firm*—Mason, Kolehmainen, Rathburn & Wyss

[57] ABSTRACT

A two pair station protector is used at a station to protect pairs of telephone circuit lines from high voltage or surge currents and includes a base assembly having an upstanding wall with a pair of notches, in each of which is insertable an insulating grommet and through each of which is extendable said lines. The base assembly also includes an overvoltage arrester mounting section for overvoltage arresters, a line terminal section containing four line terminals and a ground terminal coupled to the arresters and a storage space between the upstanding wall and line terminal section. In order to facilitate the wiring of the telephone lines extending through the grommets to the line terminals and to associate the line terminals with the arresters to which it is coupled, the line terminals are disposed between the upstanding wall and the arrester mounting section such that two of the line terminals are in alignment with one of the notches and the other two of the line terminals are aligned with the other notch. In the preferred embodiment, a cover is slidably mounted over the base assembly to protect the base assembly from the weather, insects and tampering and the station protector has two in line mounting holes and an offset mounting hole to facilitate mounting of the station protector to a mounting surface.

10 Claims, 6 Drawing Figures

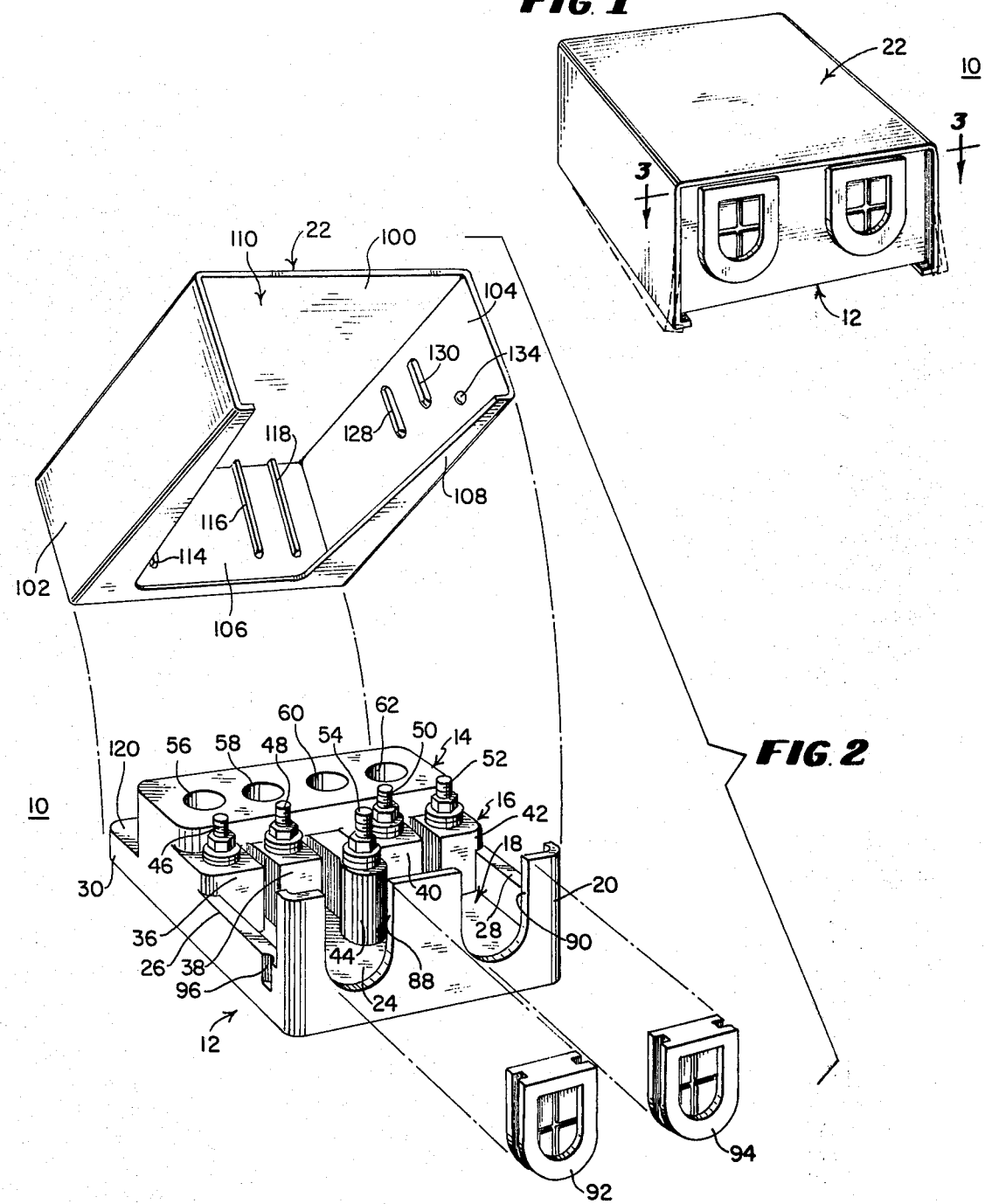

TWO PAIR STATION PROTECTOR

The present invention relates to a station protector and, more particularly, to a new and improved station protector for protecting multiple pairs of telephone circuit lines from high voltage or surge currents.

In order to connect each telephone set including all of the extensions for the same telephone number at a remote location to the telephone central office, a pair of telephone lines normally must be extended between the remote location, such as a house or the like, and the telephone central office. For at least the purposes of the present application, the term "station" will be used to refer to not only the telephone equipment including the telephone set and the lines at the remote location, but also the environment, such as the house or the like, at which the equipment is located. Each such telephone line must be coupled to an overvoltage arrester so that the station including the telephone equipment, other property and/or people using the equipment are protected from high voltages or surge currents occurring on the telephone lines due to lightning or the like.

One type of carbon overvoltage arrester which can be coupled to each telephone line is disclosed in U.S. Pat. No. 3,703,665, which patent is assigned to the assignee of record of the present application. As disclosed in U.S. Pat. No. 3,703,665, the overvoltage arrester has a spark gap which is sparked over due to a high voltage surge, thus permitting the surge current to flow from the protected line to ground potential instead of the telephone equipment at the individual stations.

When a single pair of telephone lines is extended between the station and the telephone central office, such an overvoltage arrester is coupled to each of the two lines to protect the station by mounting the arresters in a circuit or station protector such as the one disclosed in U.S. Pat. No. 3,310,712, which is also assigned to the assignee of record of the present application. The circuit protector therein disclosed is capable of mounting two overvoltage arresters in a housing protected from the weather, insects and tampering by unauthorized persons. One electrode of each of the overvoltage arresters in the station protector is coupled to a line terminal to which is coupled one of the telephone lines. The other electrode of each of the overvoltage arresters is coupled to a grounded terminal. In the event the spark gap in the overvoltage arrester is sparked over due to a high voltage surge, the telephone line is coupled to ground potential through the shorted spark gap and thereby is protected.

As previously indicated, the station protector disclosed in U.S. Pat. No. 3,310,712 can only be utilized in protecting a single pair of telephone lines at a given station. If more than one pair of telephone lines are to be protected at a given station or if each line of a pair of telephones is to be protected by more than one arrester, it would be necessary to utilize two separate station protectors of the type shown in U.S. Pat. No. 3,310,712 or couple additional arresters directly to the line terminals in that protector.

Alternatively, there are station protectors which are capable of mounting more than two overvoltage arresters in order to protect the four telephone lines in the two pairs of telephone lines. One such type of station protector is disclosed in U.S. Pat. No. 3,345,542, which is also assigned to the assignee of record of the present application. However, the station protector disclosed in this latter patent does not provide the overvoltage arrester and/or the line terminations suitable protection from weather, insects or tampering, does not provide any space for wiring or storing excess wires and is not structurally satisfactory for efficient and orderly handling of the telephone lines to be protected.

Accordingly, objects of the present invention are to provide a new and improved station protector that is used in protecting two pairs of telephone lines from high voltages or surge currents by appropriate overvoltage arresters; that is readily mountable in station type applications either indoors or outdoors; that contains improved and enlarged space for wiring and storing excess wires; that has a tamperproof cover which is easily removed without special tools; that affords protection from the weather or insects; that contains separate openings with grommets located therein for in-line terminations of separate telephone lines; and that provides for efficient and orderly handling of line pairs which are being protected.

In accordance with these and many other objects of the present invention, an embodiment of the present invention comprises a two pair station protector used in protecting two pairs of telephone lines at a given station from high voltages or surge currents occurring on the lines. The two pair station protector includes a base assembly made of a high dielectric material having a base, an upstanding wall projecting from the base at one end with a pair of U-shaped notches or apertures with grommets located in each and opposed side edges extending between the upstanding wall and an opposite second end portion of the base. Extending between the side edges adjacent the second end portion is an overvoltage arrester mounting section in which is located requisite overvoltage arresters having line and ground electrodes. The line electrode of each of the overvoltage arresters is coupled to one of a plurality of line terminals positioned on the base between the arrester mounting section and the upstanding wall. The ground electrode of each of the overvoltage arresters is coupled to a ground terminal centrally located on the base between the side edges and located between the line terminals and the upstanding wall. Advantageously, there is a sufficient amount of storage area between the terminals and the upstanding wall to allow for the wiring of telephone lines to the line and ground terminals and for the storage of excess wires. Moreover, each of the U-shaped notches or apertures in the upstanding wall and through which the telephone lines extend into the station protector, are positioned so as to be substantially aligned with two of the line terminals for easy connection and association of the lines to the line terminals.

In the preferred embodiment, a cover is provided for the station protector to provide protection for the base assembly from weather, insects and tampering. The cover has a covering wall, opposed cantilevered side walls, an end wall and a continuous flange along an edge of the side and end walls and is designed to slide over the base assembly. When the cover is properly positioned about the base assembly, the continuous flange of the cover snugly fits against the base forcing the top wall of the cover against the top of the upstanding wall, a plurality of ribs on the cantilevered side walls against the base side edges, a plurality of ribs on the end wall against the top of the second end portion of the base and a small arcuate projection on each cantilevered side wall into detent like catches in the base side edges. The projections and detents act as covert tamperproofing because the cover can only be removed from the base assembly by deflecting the cantilevered side walls away from the base side walls. In addition, in the preferred embodiment, the station protector has in line mounting holes located in the storage area and the second end portion and an offset mounting hole positioned adjacent one of the base side edges in the storage area.

Many other objects and advantages of the present invention will become apparent from the following detailed description in conjunction with the following drawings:

FIG. 1 is a perspective view of the two pair station protector embodying the present invention;

FIG. 2 is an exploded view of the two pair station protector of FIG. 1;

Figure 3:
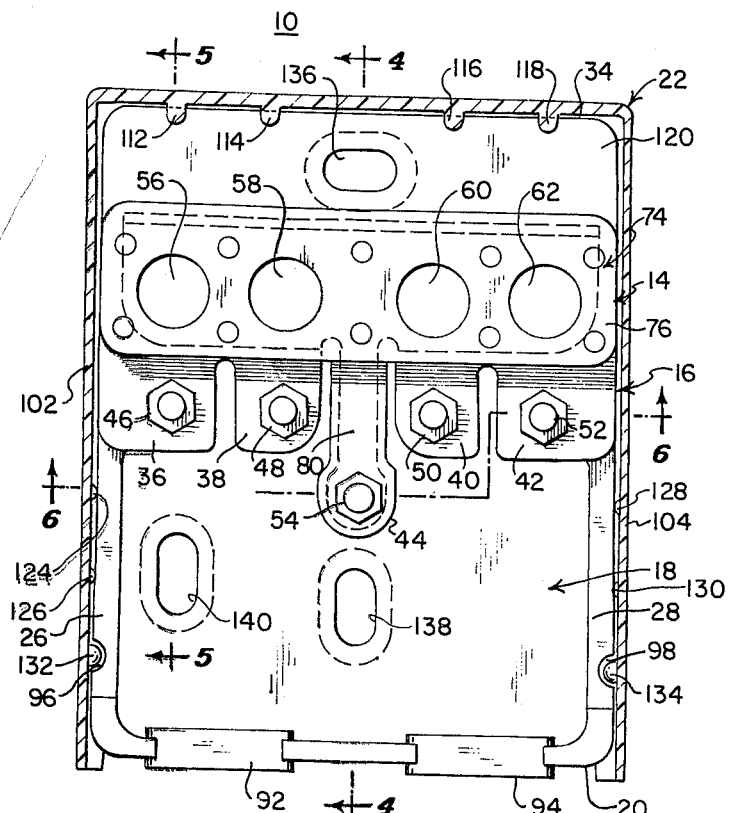
FIG. 3 is a cross-sectional view of the station protector of FIG. 1 taken along line 3—3 of FIG. 1.

Referring now more specifically to the drawings, therein is disclosed a two pair station protector which is generally designated by the numeral 10 and which embodies the present invention. The two pair station protector 10 is used in protecting a station at which is located two pairs of telephone lines that extend between the station and a telephone central office. The station protector 10 includes a base assembly 12 having an overvoltage arrester mounting portion or section 14, a terminal section 16 and a storage area or section 18 located between the terminal section 16 and an upstanding wall 20 of the base assembly 12. A cover 22 is designed to slide over and about the base assembly 12 to protect the base assembly 12 from the weather and insects and to insure that the station protector 10 is protected from tampering by unauthorized personnel.

A base portion 24 of the base assembly 12 as well as the overvoltage arrester mounting section 14, the wall 20 and side walls 26 and 28 forming a part of side edges 30 and 32 is molded and made of a high dielectric material to provide adequate insulation for the telephone lines coupled to the station protector 10. The base portion 24 is generally rectangular in shape and is made of the high dielectric material, such as phenolic or an approved equivalent. Side edges 30 and 32 of the base portion 24 are slightly tapered as they extend from the wall 20 toward an end portion 34 such that the width of the base portion 24 between the side edges 30 and 32 is slightly less at the end portion 34 than at the wall 20. The taper of the edges 30 and 32 is provided to insure that the edges 30 and 32 snugly fit against the cover 22 and for ease in installing the cover 22 about the base assembly 12. In one embodiment, the angle of the taper is thirty minutes.

The terminal section 16 is centrally located between the end portion 34 and the upstanding wall 20 and contains four line terminal mounts or raised portions 36, 38, 40 and 42 and a ground terminal mount 44 centrally located between the side edges 30 and 32. The mounting portions 36, 38, 40, 42 and 44 are molded with the base portion 24 and support line terminals 46, 48, 50 and 52 and a ground terminal 54, respectively.

The line terminals 46, 48, 50 and 52 are disposed directly in front of the overvoltage arrester or mounting section 14, which contains four cavities or holes 56, 58, 60 and 62. Although the station protector 10 is shown in the drawings without any arresters disposed in the cavities 56, 58, 60 or 62, the cavities 56, 58, 60 and 62 are capable of receiving or housing a carbon element type arrester, such as the one disclosed in U.S. Pat. No. 3,703,665, or a two element gas tube arrester having two electrodes projecting into a gas chamber so as to form a spark gap between the electrodes or any other type of carbon or gas type of arresters.

Figure 5:
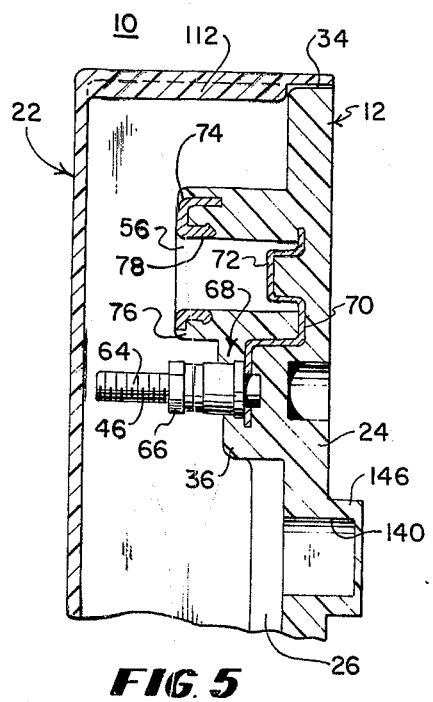
FIG. 5 is a cross-sectional view, partially cutaway, taken along line 5—5 of FIG. 3.
Figure 6:
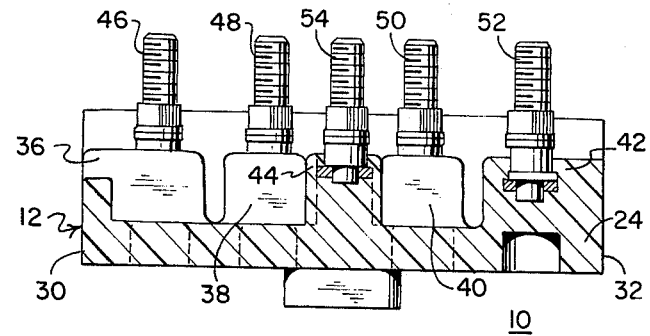
FIG. 6 is a cross-sectional view taken along line 6—6 of FIG. 3 with the cover of the station protector removed.

As can be best seen in FIG. 5 and as illustrated in connection with line terminal 46, each of the line terminals 46, 48, 50 and 52 has a threaded conductive upper portion 64 on which is disposed a nut 66 to secure a telephone line to the line terminal 46. A lower holding portion 68 of the line terminal 46 is embedded in the line terminal mount 36 and is coupled to a tortuous line conductor or member 70 which also is embedded in the base portion 24. The line conductor 70 extends into the lower end of the cavity 56 to form a line contact 72. When an overvoltage arrester is mounted in the cavity 56, the line electrode of the overvoltage arrester abuts against or is coupled to the line contact 72 such that the line electrode is coupled to the upper portion 64 of the line terminal 46 through the line conductor 70 and the lower holding portion 68 of the line terminal 46.

Figure 4:
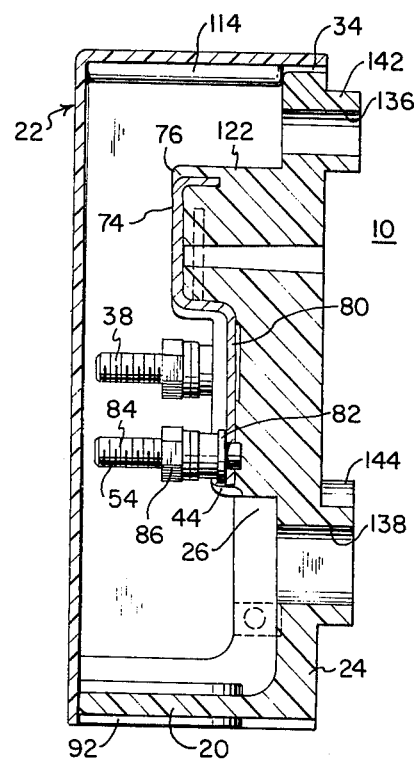
FIG. 4 is a cross-sectional view of the station protector taken along line 4—4 of FIG. 3.

When the overvoltage arrester is so mounted in the cavity 56, the ground electrode of the overvoltage arrester makes contact or is coupled with a ground plate 74 embedded in the overvoltage arrester mounting section 14. More specifically, and as best seen in FIGS. 3, 4 and 5, the ground plate 74 is embedded along a top edge 76 of the mounting section 14 and has holes in axial alignment with the cavities 56, 58, 60 and 62 such that the arresters can be inserted through the ground plate 74 into the cavities 56, 58, 60 and 62. As illustrated in FIG. 5 in connection with the cavity 56, the ground plate 74 also has a lip portion 78 which is embedded about the upper portion of the cavity 56 and into which is threaded a cap portion of the overvoltage arrester inserted into the cavity 56. In this manner and since the ground electrode of the arrester is coupled to such a cap, the ground electrode is coupled to the ground plate lip 78 and to the ground plate 74.

The ground plate 74 also includes a conductive ground strap 80 (FIGS. 3 and 4) that extends through the ground terminal mount 44 and is connected to a lower portion 82 of the ground terminal 54. The lower portion 82 is connected to an upper threaded portion 84 of the ground terminal 54 to which a ground line is securable by a nut 86. When the ground line is so connected, the ground plate 74 is maintained at ground potential. Thus, whenever a high voltage or surge current occurs on the line connected to the line terminal 46, it is transmitted through the line contact 70 to the line electrode of the overvoltage arrester located in the cavity 56. The spark gap in the arrester sparks over such that the high voltage or surge current is coupled to the ground electrode and by means of the ground plate 74 to the ground terminal 54 so that it is dissipated to ground potential.

The station protector 10 is designed to facilitate the association of the line terminals 46, 48, 50 and 52 with the overvoltage arresters in the cavities 56, 58, 60 and 62 by having the line terminals 46, 48, 50 and 52 directly in front of the cavities 56, 58, 60 and 62, respectively. In addition, the station protector 10 is designed to facilitate the coupling of each line pair to the appropriate line terminals 46, 48, 50 or 52. More specifically, the upstanding wall 20 has two separate apertures or holes 88 and 90 with an insulating grommet, such as rubber or the like, 92 insertable into the aperture 88 and a similar grommet 94 insertable into the aperture 90. A pair of telephone lines at the station can be extended through the grommet 92 and the lines are readily connected to the line terminals 46 and 48 because the line terminals 46 and 48 are aligned with or associated with the aperture 88 whereas the telephone lines extended through the grommet 94 are readily connected to the line terminals 50 and 52 because the line terminals 50 and 52 are aligned with or associated with the aperture 90. In this manner, an installer has no difficulty in connecting the individual lines in the line pair to the appropriate line terminals. The grommets 92 and 94 are used to insure that the base assembly 12 is protected from the weather, insects and tampering when the cover 22 is positioned over the base assembly 12. Moreover, since a minimum number of lines are extended through each of the grommets 92 and 94, the grommets 92 and 94 provide improved sealing of the base assembly 12.

Thus, the station protector 10 enables the telephone lines to be readily connected to the line terminals 46, 48, 50 and 52. Moreover, by having two separate openings 88 and 90 in the upstanding wall 20, the station protector 10 is readily adaptable for use in underground applications wherein a conductor with two pairs of wires can be inserted through the grommet 92 and connected to the line terminals 46, 48, 50 and 52, to which terminals 46, 48, 50 and 52 station conductors can be coupled, and extended out through the grommet 94.

As can be particularly seen in FIG. 3, there is a substantial amount of space in the storage section 18 between the upstanding wall 20 and the line terminal mounts 36, 38, 40 and 42 and the ground terminal mount 44. This space allows for easy wiring of the pairs of lines to the line terminals 46, 48, 50 and 52 and also provides a space for storing excess wire. In addition, this space enables the easy connection of a ground line that may be extended through either the grommet 92 or the grommet 94 to the ground terminal 54. For instance, in one embodiment of the station protector 10, the width of the station protector 10 along the upstanding wall 20 between the outside surfaces of the side edges 30 and 32 is approximately 3½ inches and the length of the station protector 10 between the outside surface of the upstanding wall 20 and the rear end portion 34 is approximately 4.2 inches. This enables the space between the terminal mounts 36, 38, 40 and 42 and the inside surface of the upstanding wall 20 to be approximately 1.9 inches. Thus, there is much more room between the line terminals 46, 48, 50 and 52 and the wall 20 than in previously designed station protectors such that there is sufficient space in the storage area 18 for storing excess wire and for coupling the telephone lines to the line terminals 46, 48, 50 and 52 and to the ground terminal 54.

Extending between the wall 20 and the terminal mount 36 is the side wall 26 whereas the side wall 28 extends between the terminal mount 42 and the wall 20. In the outside surface of the side wall 26 is a detent or semicircular groove catch 96. A similar semicircular groove or detent catch 98 is located in the side wall 28. The detent catches 96 and 98 are used in properly securing the cover 22 to the base assembly 12 to insure that the station protector 10 has appropriate protection from the weather, insects and tampering by an unauthorized person.

More specifically, the cover 22 has a covering wall 100, a pair of cantilevered side walls 102 and 104, an end wall 106, and a continuous flange or lip 108 that extends along the bottom edge of the walls 102, 104 and 106. An open portion 110 of the cover 22 enables the cover 22 to be slid over and properly positioned about the base assembly 12. In this regard, FIG. 2 merely shows an exploded view of the station protector 10 and should not be interpreted as implying that the cover 22 can be lifted off of the base assembly 12.

When the cover 22 is so positioned about the base assembly 12, the rear end portion 34 abuts against the wall 106 of the cover 22. In addition, ribs 112, 114, 116 and 118 on an inner surface of the wall 106 abut against the top of a ledge portion 120 extending between the end portion 34 of the base assembly 12 and an edge 122 of the mounting section 14, ribs 124 and 126 on the inner surface of the side wall 102 of the cover 22 abut against the side wall 26 of the base assembly 12, and ribs 128 and 130 located on the inner surface of the side wall 104 of the cover 22 abut against the side wall 28. In this manner, the cover 22 is positively held against the base assembly 12 since the lower surfaces of the base assembly 12 are firmly held against the flange or lip 108.

Moreover, when the base assembly 12 is so positioned in the cover 22, a small arcuate projection 132 on the inner surface of the side wall 102 is positioned in the detent catch 96. Similarly, a small arcuate projection 134 extending inwardly from the side wall 104 of the cover 22 is positioned within the detent catch 98 in the side wall 28 of the base assembly 12. By having the projections 132 and 134 projecting into the detent catches 96 and 98, the cover 22 cannot be slid off of the base assembly 12 by unauthorized persons.

More specifically, the detent catches 96 and 98 and the projections 132 and 134 are not visible from the outside of the station protector 10. This is illustrated particularly in FIG. 1 of the drawings wherein the cover 22 is shown covering the open portions of the base assembly 12. In order to release the projection 132 from the detent catch 96, the side wall 102 must be deflected slightly away from the side edge 30 of the base assembly 12. Since the side wall 102 is made of a resilient material, it can be so deflected as illustrated by the phantom lines in FIG. 1 of the drawings which show the side wall 102 slightly deflected away from the side edge 30 of the base assembly 12. In the same manner and as shown by the phantom lines in FIG. 1, the projection 134 is displaced out of the detent catch 98 by deflecting the side wall 104 of the cover 22 from the side edge 32 of the base assembly 12. Once both of the side walls 102 and 104 are so deflected, the cover 22 can be readily removed from the base assembly 12 by sliding it toward the end portion 34 of the base assembly 12. Although the removal of the cover 22 requires no special tools and is quite easy for authorized personnel who realize the need to deflect the side walls 102 and 104 away from the base assembly 12, unauthorized personnel who do not know this fact and who cannot see the detent catches 96 and 98 and/or the projections 132 and 134 from the outside of the station protector 10, cannot easily remove the cover 22. Accordingly, the cover 22 provides the station protector 10 with adequate protection not only from weather and insects but from tampering by unauthorized personnel.

The station protector 10 is normally mounted upon a wall or the like at the station at which it is located. In many instances, the base assembly 12 is mounted on a vertical mounting surface as well as a horizontal one. In order to mount the base assembly 12, three elongated apertures 136, 138 and 140 are provided in the base portion 24 of the base assembly 12. The aperture 136 is centrally located between the side edges 30 and 32 of the base assembly 12 and extends through the ledge portion 120 and a collar 142 projecting from the base portion 24. Likewise, the elongated aperture 138 is centrally located between the side edges 30 and 32 and extends through the base portion 24 of the base assembly 12 and a standoff or collar 144 projecting from the base portion 24. The elongated axes of the apertures 136 and 138 are at right angles to each other such that fastening devices extended through the apertures 136 and 138 are readily inserted and easily aligned due to the right angle positioning of the elongated axes of the apertures 136 and 138.

In addition, the mounting of the station protector 10 is facilitated due to the provision of the third aperture 140. The aperture 140 is positioned near the side wall 26 of the base assembly 12 and extends through the base portion 24 and a collar 146. The elongated axis of the aperture 140 is generally parallel to the elongated axis of the aperture 138 but is not in alignment with the aperture 136 such that offsetting mounting of the station protector 10 is easily accomplished. When the station protector 10 is mounted on a mounting surface such as a wall or the like, the extreme portions of the collars 142, 144 and 146 abut against the wall portion and firmly secure the station protector 10 against the mounting surface.

Although the present invention is described with reference to a single illustrative embodiment thereof, it should be understood that numerous other modifications and embodiments of the invention can be devised by those skilled in the art that will fall within the spirit and scope of the principles of this invention.

What is claimed and desired to be secured by Letters Patent of the United States is:

1. A station protector for mounting overvoltage arresters of the type which protect telephone lines from high voltages or surge currents occurring on said lines, said station protector comprising:
    a base assembly having a base portion with a pair of side edges extending between first and second opposed end portions of said base assembly, and an upstanding wall portion at said first end portion,
    a mounting section disposed on said base portion adjacent said second end portion and between said side edges, said mounting section having mounting means for mounting said overvoltage arresters,
    a terminal section disposed on said base portion adjacent said mounting section and between said mounting section and said upstanding wall, said terminal section generally centrally located between said upstanding wall and said second end portion and having at least four line terminals to be coupled to said lines and a ground terminal, and
    a storage area being defined by said upstanding wall, said terminal section and said side edges, the distance between said upstanding wall and said terminal section being at least approximately 40 percent of the distance between said upstanding wall and said second end portion.

2. A station protector as set forth in claim 1 wherein each of said mounting means includes a cavity having a line contact at the base thereof coupled to one of said line terminals and a portion of a ground plate coupled to said ground terminal extending into the cavity such that one electrode of the overvoltage arrester is coupled to the line contact and the other electrode is coupled to the portion of the ground plate extending into the cavity.

3. The station protector as set forth in claim 1 wherein said mounting section includes four mounting means for mounting four overvoltage arresters, each one of which is associated with different ones of said line terminals, and said upstanding wall has a pair of apertures, one of said apertures being associated with two of said line terminals and said other aperture being associated with said other two of said line terminals.

4. A station protector for mounting overvoltage arresters to protect telephone lines from high voltages or surge currents occurring on said telephone lines, said protector comprising:
    a base assembly of dielectric material, said base assembly having an upstanding wall with a pair of side edges extending from said upstanding wall,
    an overvoltage arrester mounting section having mounting means for said overvoltage arresters,
    a terminal section having at least four line terminals and a ground terminal disposed between said side edges and between said arrester mounting section and said upstanding wall, said ground terminal being positioned nearer to said upstanding wall than said line terminals, and
    a pair of access means disposed in said upstanding walls, one of said access means being positioned in said upstanding wall so as to provide access to two of said line terminals and said other access means being positioned in said upstanding wall to provide access to two others of said line terminals.

5. The station protector as set forth in claim 4 including:
    a pair of side walls disposed along said side edges,
    a detent catch means located in at least one of said side walls, and
    a cover means having projection means adapted to be disposed within said detent catch means in said side wall, said cover means protecting said base assembly.

6. The overvoltage protector as set forth in claim 4 wherein said cover having a pair of deflectable cover side walls and said detent catch means is a pair of grooves, one of which is located in one of said side walls and the other of which is located in the other of said side walls, and said projection means project from said cover side walls which fit about the side edges of said base assembly.

7. The overvoltage protector as set forth in claim 4 wherein each of said mounting means has a line contact which is coupled to one of the line terminals and has a portion of a ground plate which is coupled to said ground terminal and which extends along said overvoltage arrester mounting section.

8. The station protector as set forth in claim 6 wherein said overvoltage arrester mounting section has at least four mounting means disposed in said overvoltage arrester mounting section in a line generally parallel to said upstanding wall and wherein said line terminals are disposed in said terminal section in a line generally parallel to said upstanding wall, each of said line terminals being positioned in alignment with one of said mounting means between said mounting means and said upstanding wall so that each line terminal is associated with one of said mounting means.

9. A station protector in which is mountable overvoltage arresters to protect telephone lines from high voltage or surge currents, said station protector comprising:

a base assembly having a base portion with a pair of side edges extending between first and second end portions, an upstanding wall at said first end portion, and a ledge portion at said second end portion extending between said side edges, an overvoltage arrester mounting means disposed adjacent said ledge portion and extending between said side edges, a terminal means disposed between said mounting means and said upstanding wall, said terminal means including a plurality of terminals coupled to said overvoltage arrester mounting means, a first elongated aperture disposed in said ledge portion and centrally located between said side edges, a second elongated aperture disposed between said terminal section and said upstanding wall, said second aperture being centrally located between said side edges, and a third elongated aperture disposed between said terminal section and said upstanding wall, said third aperture being disposed adjacent one of said side edges.

10. The station protector as set forth in claim 9 wherein the elongated axis of said first aperture extends generally parallel to said upstanding wall and the elongated axes of said second and third apertures extend generally parallel to said side edges.

* * * * *